Figure 1:
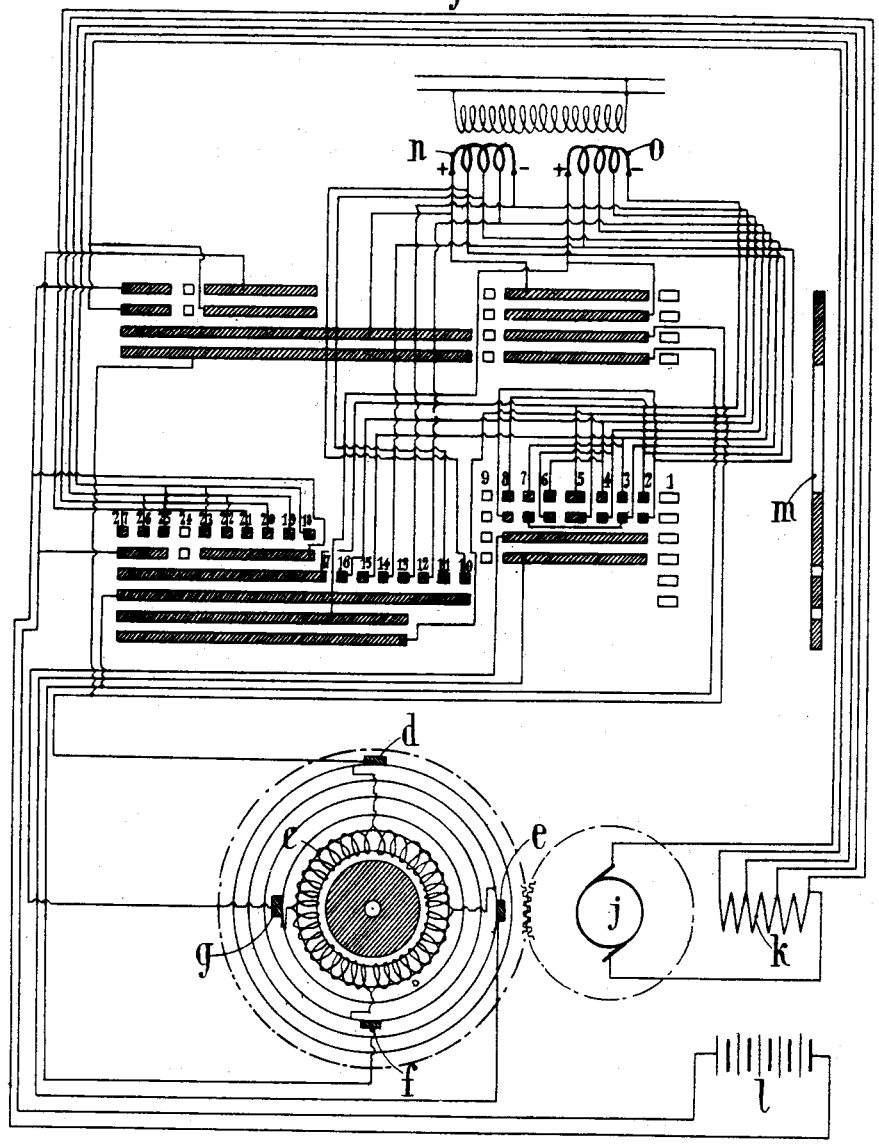
Figure 2:
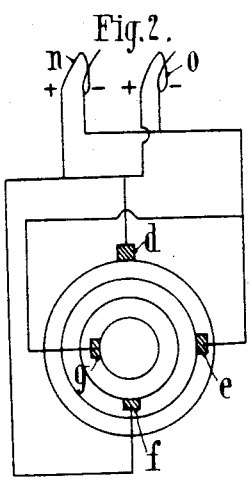
Figure 3:
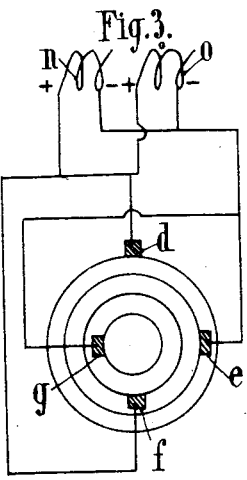
Figure 4:
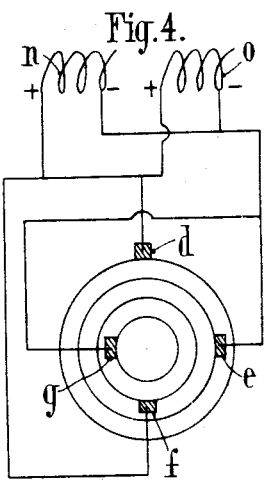
Figure 5:
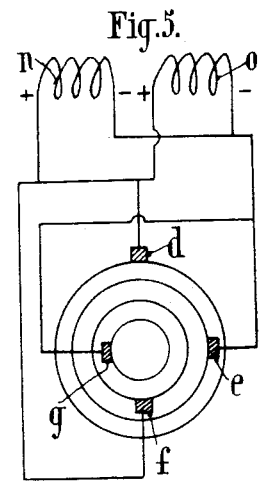
Figure 6:
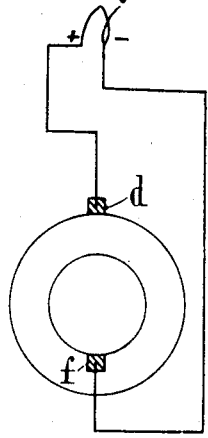
Figure 7:
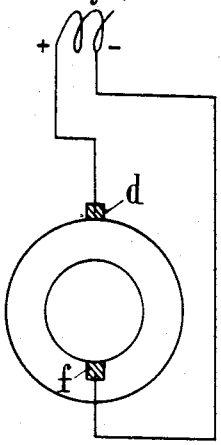
Figure 8:
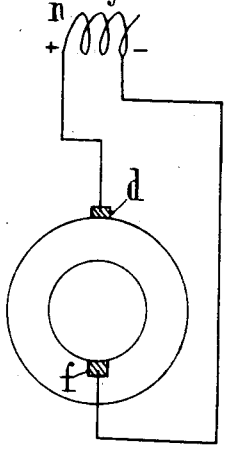
Figure 9:
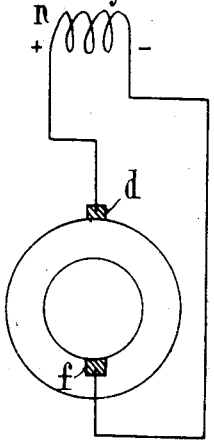
Figure 10:
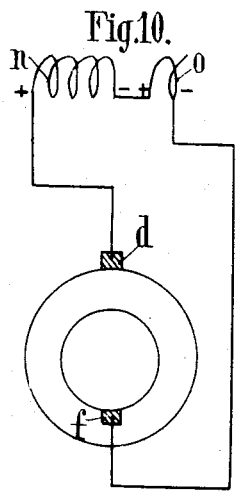
Figure 11:
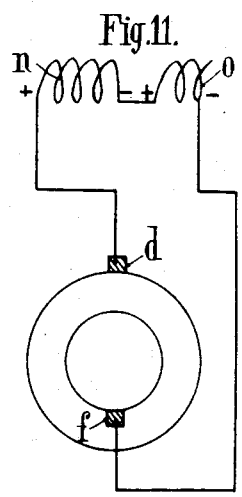
Figure 12:
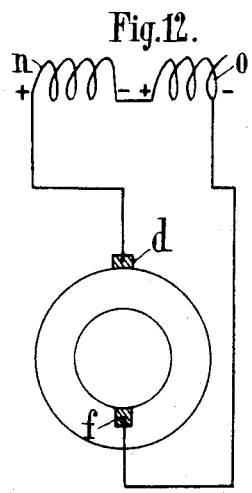
Figure 13:
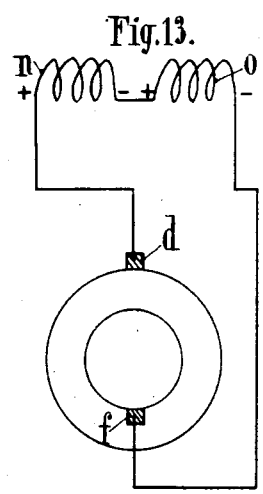
Figure 14:
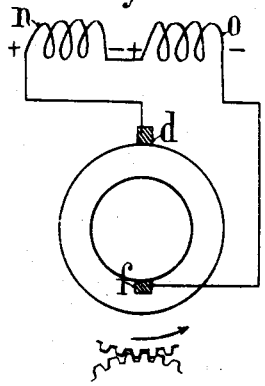
Figure 15:
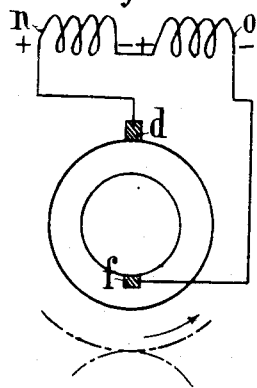
Figure 16:
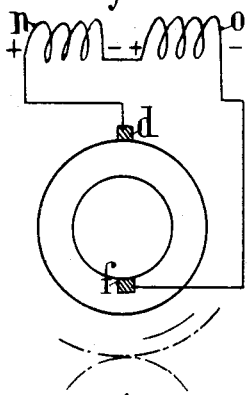

No. 682,093. Patented Sept. 3, 1901.
R. D. DE LIGNIÈRES.
CONTROL OF ALTERNATING CURRENT MOTORS.
(Application filed Mar. 22, 1901.)
(No Model.) 9 Sheets—Sheet 2.

Witnesses:
C. D. Kesler
Dennis Sumby

Inventor
René D. de Lignières
By James L. Norris
Atty

No. 682,093. Patented Sept. 3, 1901.
R. D. DE LIGNIÈRES.
CONTROL OF ALTERNATING CURRENT MOTORS.
(Application filed Mar. 22, 1901.)

(No Model.) 9 Sheets—Sheet 3.

Witnesses:

Inventor
René D. de Lignières
By James L. Norris
Atty

No. 682,093. Patented Sept. 3, 1901.
R. D. DE LIGNIÈRES.
CONTROL OF ALTERNATING CURRENT MOTORS.
(Application filed Mar. 22, 1901.)
(No Model.) 9 Sheets—Sheet 5.

Witnesses:
C. D. Kesler.
Dennis Sumby.

Inventor
René D. de Lignières
By James L. Norris.
Atty

No. 682,093. Patented Sept. 3, 1901.
R. D. DE LIGNIÈRES.
CONTROL OF ALTERNATING CURRENT MOTORS.
(Application filed Mar. 22, 1901.)
(No Model.) 9 Sheets—Sheet 6.

Witnesses:
Inventor
René D. de Lignières
By James L. Norris
Atty

No. 682,093. Patented Sept. 3, 1901.
R. D. DE LIGNIERES.
CONTROL OF ALTERNATING CURRENT MOTORS.
(Application filed Mar. 22, 1901.)
(No Model.) 9 Sheets—Sheet 7.
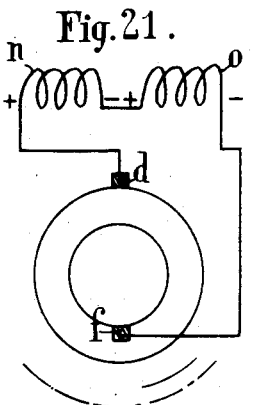
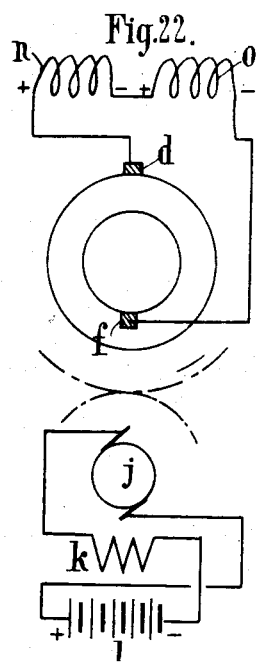
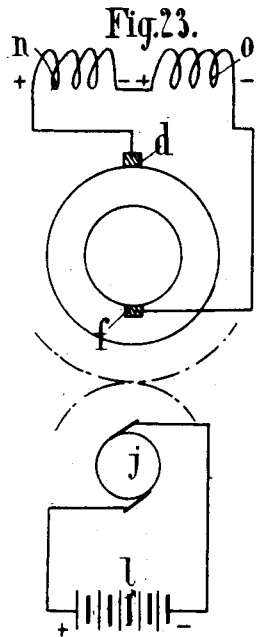
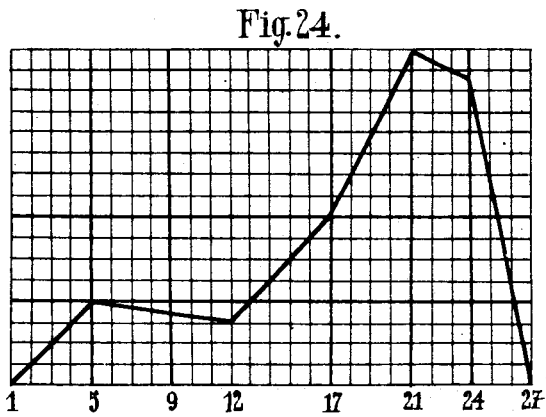
Witnesses:
Inventor
René D. de Lignières
By James L. Norris,
Atty No. 682,093. Patented Sept. 3, 1901.
R. D. DE LIGNIÈRES.
CONTROL OF ALTERNATING CURRENT MOTORS.
(Application filed Mar. 22, 1901.)
(No Model.) 9 Sheets—Sheet 8.
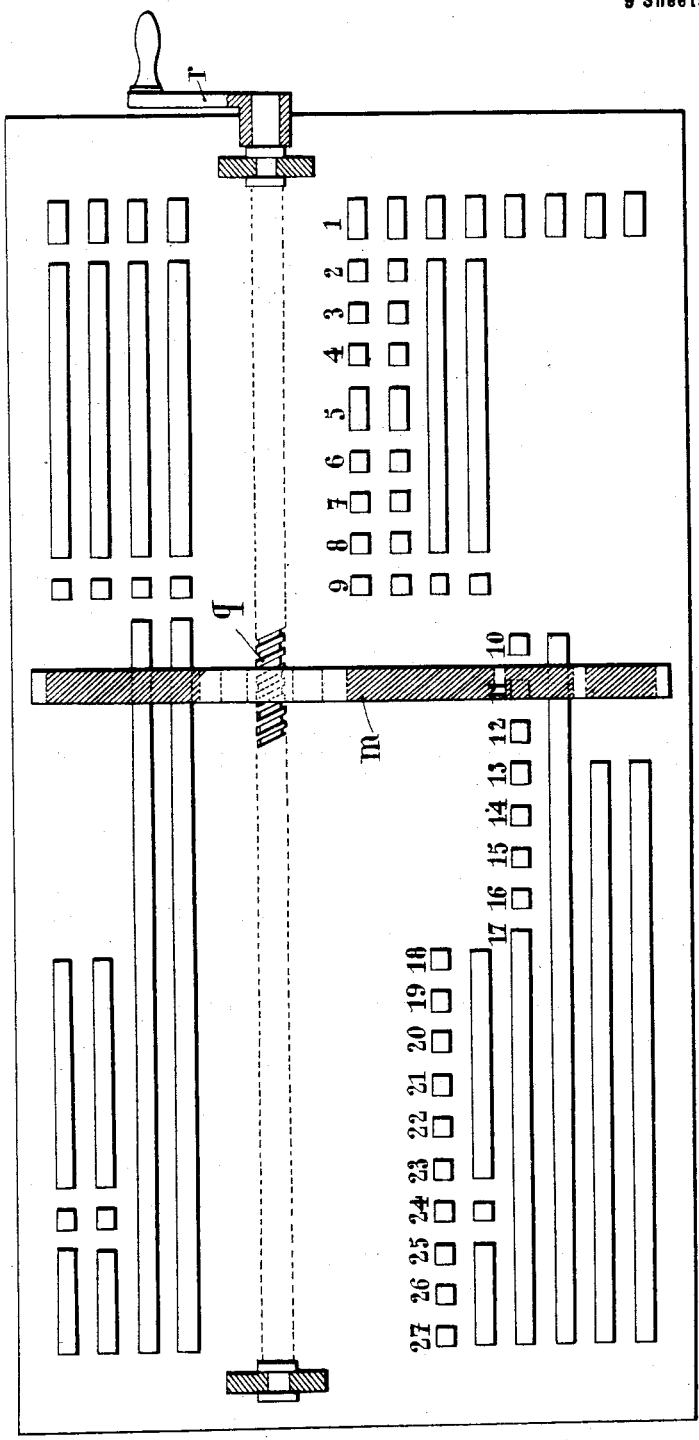

No. 682,093. Patented Sept. 3, 1901.
R. D. DE LIGNIÈRES.
CONTROL OF ALTERNATING CURRENT MOTORS.
(Application filed Mar. 22, 1901.)
(No Model.) 9 Sheets—Sheet 9.
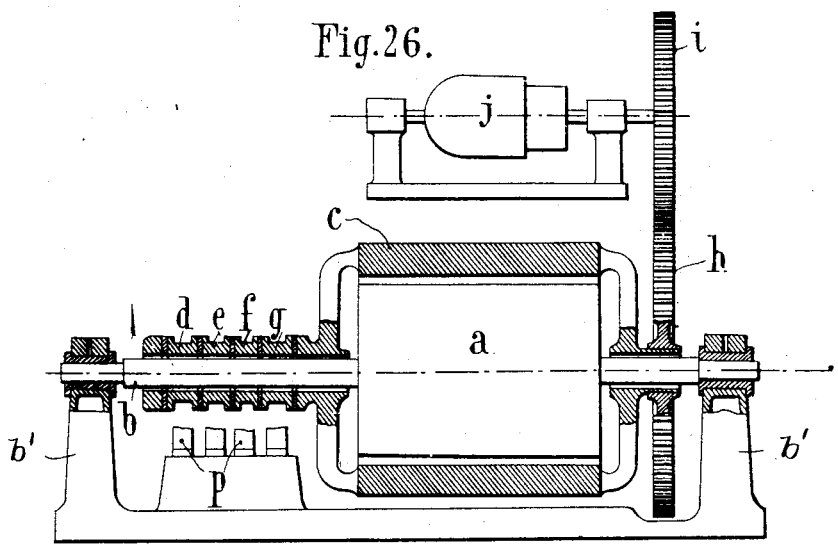
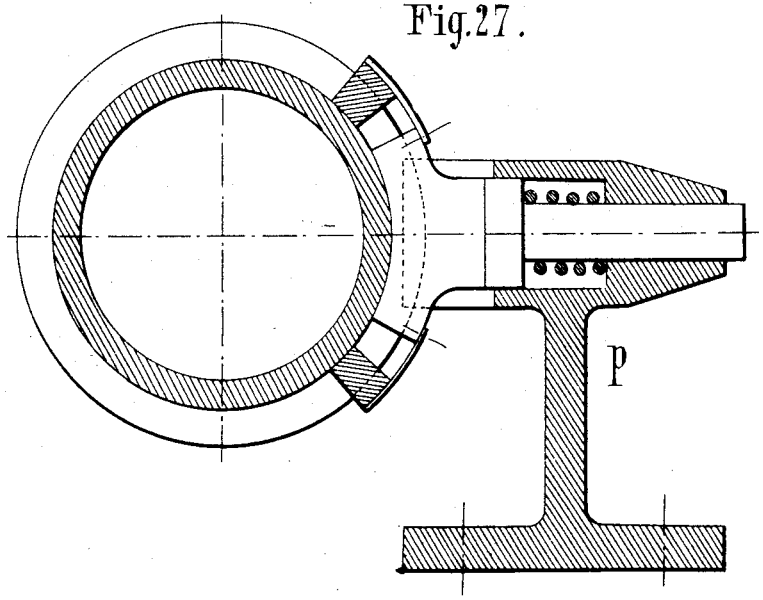
Witnesses: Inventor
René D. de Lignières
By James L. Norris
Atty

UNITED STATES PATENT OFFICE.

RENÉ DASSY DE LIGNIÈRES, OF PARIS, FRANCE.

CONTROL OF ALTERNATING-CURRENT MOTORS.

SPECIFICATION forming part of Letters Patent No. 682,093, dated September 3, 1901.

Application filed March 22, 1901. Serial No. 52,433. (No model.)

*To all whom it may concern:*

Be it known that I, RENÉ DASSY DE LIGNIÈRES, engineer, a citizen of the French Republic, residing at Paris, France, (whose post-office address is 69 Avenue de Wagram, in the said city,) have invented certain new and useful Improvements in the Control of Alternating-Current Motors, of which the following is a specification.

This invention has for its object a device the purpose of which is to enable the working speed of single-phase or polyphase alternate-current motors being varied as desired from zero to double the normal working speed while they are running by shifting a sliding contact-bar over metallic contacts.

This invention further permits of the motor being stopped suddenly without it being necessary to reverse the current to reverse the direction of the rotation of the armature, a practice which is always dangerous and injurious to the good preservation of motors.

In order that this invention may be clearly understood, I will describe it with reference to the accompanying drawings, first, the general principles on which this invention is based, and then the detailed arrangements of an application of my invention.

Figure 1 of the drawings is a diagrammatic view of the whole arrangement and working connections. Figs. 2 to 23 show diagrammatically the various circuits effected by shifting the aforesaid sliding contact-bar over the various fixed contacts of the switchboard. Fig. 24 is a diagram of the various speeds obtained by shifting the said sliding contact-bar. Fig. 25 shows the switchboard with its metallic contacts and the sliding contact-bar. Fig. 26 shows, partly in section, a motor constructed according to my invention. Fig. 27 is a detail showing on a larger scale the means for supplying current from the source of electrical energy to the inducing-field.

The invention is based on the following principles: If in a monophase or polyphase alternate-current motor both the number of poles and the voltage of the current supplied to the motor are caused to vary, it is obvious that, first, the working speed will increase when the number of poles diminishes, and, second, in consequence of the more or less high voltage the value of the available couple will vary about proportionately to the square of the voltage.

The motor, as shown in Fig. 26, consists of an armature $a$, keyed on a shaft $b$, mounted in bearings on pedestals $b'$. On the shaft $b$ is loosely mounted the inducing-field $c$, together with contact-rings $d\ e\ f\ g$, (the number of which depends upon the maximum number of poles of the motor,) and a toothed wheel $h$, gearing with a wheel $i$, keyed on the shaft of a continuous-current motor $j$, which is capable of driving the whole of the aforesaid parts. In Fig. 1 the motor $j$ is represented diagrammatically as a series-wound motor with variable resistances $k$. $l$ is the source of energy for supplying current to the motor. When the armature revolves at its normal speed, the inducing-field $c$ remaining stationary, the relative speed between the field created by the inducing and induced circuits is equal to the absolute speed of the armature. If while the armature is running at its normal speed the motor $j$ is energized by a current, this latter will revolve and cause the inducing-field $c$ to revolve. Owing to the movement of the inducing-field the coils of the armature $a$ do not act with the same relative speed as the lines of force of the inducing-field, and according to a known law the absolute speed of the armature will vary by a number of revolutions equal to that of the inducing-field. If the rotation of the inducing-field be in the same direction as that of the armature, the relative speed decreases for an instant, but the couple increases, and the armature seeks to resume the relative speed it had previously, and consequently its absolute speed will be increased by a number of revolutions equal to that of the inducing-field. Likewise, if the rotation of the inducing-field be in a direction opposite to that of the armature the relative speed increases, but the couple decreases, and the armature has a tendency to resume its relative speed, and consequently its number of revolutions decreases by a number of revolutions nearly equal to that of the inducing-field.

The following table will show the relation between the speed of the inducing-field and that of the armature, taking the speed of the inducing-field as positive when it revolves in a direction opposite to that of the armature and as negative when the said inducing-field revolves in the same direction as the armature:

| Speed of the Inducing-Field. | Speed of the Armature. |
|---|---|
| $v=0$ | $v=1$ |
| $v=0.1$ | $v=0.9$ |
| $v=0.2$ | $v=0.8$ |
| $v=1$ | $v=0$ |
| $v=-0.1$ | $v=1.1$ |
| $v=-0.2$ | $v=1.2$ |
| $v=-1$ | $v=2$ |

By the like reasoning it will be seen that if the armature be at rest and the inducing-field be rotated with the angular velocity which the armature possesses when running at the ordinary speed the latter would revolve in one direction or the other, according to the rotation of the armature, whatever the current supplied may be.

In Figs. 1 and 25 is represented a switchboard to which are attached contacts, the number and position of which may vary, according to circumstances. A sliding contact-bar $m$, Figs. 1 and 25, moved over the said fixed contact by means of an endless screw $q$, permits of connecting in parallel, in series, or in multiple series the elements of the source of energy in the case under consideration, the low-tension circuits of several transformers, or any number of sections of one and the same transformer. In order not to complicate the drawings, only two circuits of transformers $n$ $o$, Figs. 1 and 2 to 23, are shown. The arrangement comprises also the motor shown diagrammatically in Fig. 1.

The inducing-field $c$ is divided into as many sections as the maximum number of poles of the motor. The beginning of one section and the end of the next adjacent one are connected together to one of the rings $d$, $e$, $f$, or $g$. As these rings revolve at the same time as the inducing-field, the connections may be rigid. Rubbing-contacts $p$ (shown in Fig. 27) supply the current from the sections of the transformers $n$ $o$, Fig. 1, to the sections of the inducing-field through the medium of the rings $d$ $e$ $f$ $g$. The drawings suppose that the maximum number of poles of the motor is four only. Consequently four rings $d$ $e$ $f$ $g$ are provided. It is evident that the invention is not limited to the number of poles, the number depending upon the design of the motor and upon the conditions which it has to fulfil.

The connections effected successively by the sliding contact-bar $m$ when moving from right to left over the contacts of the switchboard will now be described.

Figs. 2, 3, 4, and 5 show the results of the passage of the sliding contact-bar on the first nine contacts. The contacts 1 and 9 being inactive or unconnected, the moving of the sliding contact-bar over the contacts 2, 3, and 4, Figs. 2, 3, and 4, successively switches in and couples in parallel the partial coils of the two transformers $o$ and $n$. The current from the positive poles of the transformers enters the brushes $d$ and $f$ and the current from the negative poles enters the brushes $e$ and $g$. When all the coils are switched in, Fig. 5, the voltage at the terminals of the motor will be E and the motor works as a four-pole one. The switching in of the whole of the coils of the transformers is effected through contact 5, while contacts 6, 7, and 8 effect the same connections as contacts 4, 3, and 2, Figs. 4, 3, and 2, so as to cut out without suddenness the current that becomes equal to zero when contact 9 is reached before altering the connection for grouping in series the partial coils. The grouping in series of the partial coils is effected by moving the sliding contact-bar $m$ over contact-pieces 10 to 17. The current from the positive pole of the coil $n$ then flows to the brush $d$ and the current from the negative pole of the coil $o$ to the brush $f$, the negative pole of the coil $n$ and the positive pole of the coil $o$ being connected together. When all the coils are switched in the circuit, Fig. 13, the voltage at the motor-terminals is equal to 2 E. While in the first case the number of poles was four, in the second case it is two. Consequently the speed of the motor, which was, for instance, V in the first case, will become 2 V in the second case. The motor will thus possess two normal working speeds without it being necessary to introduce resistances in the circuit.

Figs. 14, 15, 16, and 17 show the result of the passage of the sliding contact-bar $m$ over the contacts 18, 19, 20, and 21, with gradual supply of current to the motor $j$, first with all its resistances $k$ switched in and then gradually cut out. It will be understood that this motor may be replaced by a shunt on the principal motor or by any other means.

Figure 17:
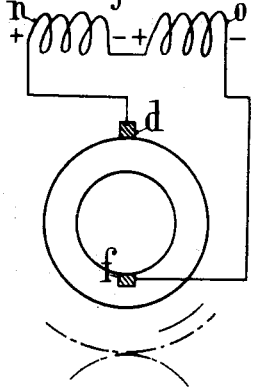

In Fig. 17 the motor $j$ is supposed to be working at full speed, the resistances being switched off. This maximum speed will be equal to the maximum speed which the armature $a$ can assume when the inducing-field $c$ remains stationary. This motor $j$ drives the inducing-field $c$, and the direction of its rotation is such that the inducing-field $c$ revolves in the same direction as the armature. The speed of the armature will when the contact-bar $m$ is on contact 21 be equal to 2 (2 V) or 4 V, and the number of poles not varying the normal speed of the armature would be 2 V. This speed is doubled in consequence of the inducing-field rotating in the same direction and at the same speed as the armature.

Figure 18:
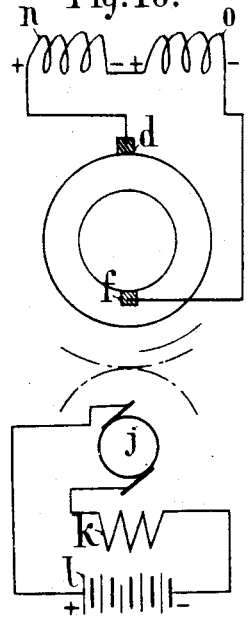
Figure 19:
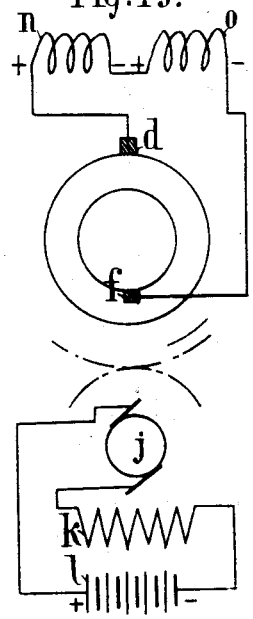
Figure 20:
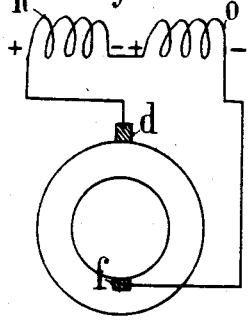

Figs. 18 to 23 show the movement of the sliding contact-bar $m$ on the contacts 22 to 27 for effecting the sudden stoppage of the armature $a$ while running. This stoppage is effected by reversing the direction of the rotation of the inducing-field—that is to say, by causing it to revolve in a direction opposite to that of the armature. Figs. 18, 19, and 20 show the gradual stoppage of the motor $j$, while Figs. 21, 22, and 23, with the arrows pointing from right to left, show the setting in a motion of the inducing-field $c$ in a direction opposite to that of the armature $a$. In the hereinbefore-described example the motor $j$ is supposed to have been switched in the circuit only when armature $a$ has attained the normal speed corresponding to the bipolar arrangement of the motor; but the motion of the inducing-field may in accordance with my invention be brought into action every time a normal speed is attained, so that the armature may assume all the speeds comprised between zero and that equal to double the ordinary working speed.

In the hereinbefore-described example the switchboard may be provided with contact-pieces permitting of the inducing-field being set in motion as soon as the sections of the transformers are connected in parallel and the speed V, corresponding to the four-pole arrangement of the motor, has been attained—that is to say, after contact 5 has been reached. If it be supposed that the motor have a larger number of poles, the switchboard may be provided with additional contacts for switching in the motor $j$ each time a normal speed is reached. It is evident that it would be necessary for each working speed to introduce into the circuit of the motor $j$ (which is supposed to be series-wound, but may be of another kind or replaced by any other means) resistances such that the speed to be imparted to the inducing-field $c$ has for maximum the speed which is at that moment the working speed of the armature $a$. The stoppage is obtained when the auxiliary motor $j$ is caused to rotate with a speed such that the inducing-field $c$ reaches a speed equal to that of the armature $a$ and in the opposite direction.

Fig. 24 is a diagram showing the progressive speeds and the spontaneous stoppage effected by the switchboard. On the abscissa are marked the twenty-seven contacts of the switchboard, while the ordinates represent the speeds from zero to 4 V. On the sliding contact-bar leaving contact 5, which supplies the full current to the four-pole motor, the current is cut and afterward supplied gradually to the bipolar arrangement. The speed is not reduced to zero because of the momentum due to the motion of the motor and of the mechanical energy stored in the mass of the armature which was running at its normal speed. As the manipulation required to move the sliding contact-bar over the fixed contacts can be rapidly effected, the decrease attained in the speed is but small.

Fig. 25 shows the switchboard, the sliding contact-bar $m$, and the endless screw $q$, on which the said sliding contact-bar moves, the screw being operated by a crank-handle $r$, fixed to one end thereof.

Having now particularly described and ascertained the nature of this invention and in what manner it may be performed, I declare what I claim is—

1. In a controller for alternating-current induction-motors, means for changing the number of poles of the motor and means for moving the inducing-field member in one direction or the other.

2. In a controller for alternating-current induction-motors, means for changing the number of poles of the motor, means for moving the inducing-field member in one direction or the other, and means for varying the voltage in the motor by connecting up therewith a greater or less number of convolutions of the secondary coils of a transformer.

3. In a controller for alternating-current induction-motors, means for changing the number of poles of the motor, and an auxiliary motor for moving the inducing-field member in one direction or the other.

4. In a controller for alternating-current induction-motors, means for changing the number of poles of the motor, means for varying the voltage in the motor by connecting up therewith a greater or less number of convolutions of the secondary coils of a transformer, and an auxiliary motor for moving the inducing-field member in one direction or the other.

In testimony whereof I have hereunto set my hand in presence of two subscribing witnesses.

RENÉ DASSY DE LIGNIÈRES.

Witnesses:
 EDWARD P. MACLEAN,
 EMILE KLOTZ.